United States Patent
Suemasa

(10) Patent No.: US 11,862,397 B2
(45) Date of Patent: Jan. 2, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventor: Riki Suemasa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 92 days.

(21) Appl. No.: 17/687,481

(22) Filed: Mar. 4, 2022

(65) Prior Publication Data

US 2022/0301771 A1 Sep. 22, 2022

(30) Foreign Application Priority Data

Mar. 17, 2021 (JP) .................................. 2021-043794

(51) Int. Cl.
*H01G 4/008* (2006.01)
*H01G 4/30* (2006.01)
*H01G 4/12* (2006.01)

(52) U.S. Cl.
CPC ............. *H01G 4/0085* (2013.01); *H01G 4/30* (2013.01); *H01G 4/1227* (2013.01)

(58) Field of Classification Search
CPC ........ H01G 4/0085; H01G 4/30; H01G 4/012; H01G 4/1227; H01G 4/2325; H01G 4/1209; H01G 4/228; H01G 4/306; H01G 2/02; H01G 4/008; H01G 4/1218; H01G 4/232
See application file for complete search history.

(56) References Cited

U.S. PATENT DOCUMENTS

| | | | | |
|---|---|---|---|---|
| 6,366,444 | B1* | 4/2002 | Yagi | H10N 30/877 361/321.1 |
| 9,236,185 | B1* | 1/2016 | Oguni | H01G 4/1227 |
| 2001/0055193 | A1* | 12/2001 | Chazono | H01G 4/1209 361/311 |

(Continued)

FOREIGN PATENT DOCUMENTS

WO 2015016309 A1 2/2015

OTHER PUBLICATIONS

Kishi et al., Base-Metal Electrode-Multilayer Ceramic Capacitors: Past, Present and Future Perspectives, Japanese Journal of Applied Physics, vol. 42, Part 1, No. 1, Jan. 2003, pp. 1-15.

(Continued)

*Primary Examiner* — Michael P McFadden
(74) *Attorney, Agent, or Firm* — Law Office of Katsuhiro Arai

(57) ABSTRACT

A ceramic electronic device includes a multilayer structure in which each of a plurality of dielectric layers including Ba and Ti and each of a plurality of internal electrode layers including Ni and Sn are alternately stacked. A discontinuity is formed in at least one of the plurality of internal electrode layers, the discontinuity being a break in a cross section including a stacking direction of the multilayer structure. An Sn high concentration portion, of which an Sn concentration is higher than an average Sn concentration of the one of the internal electrode layers, is formed on a part of a surface of the at least one of the internal electrode layers, the part of the surface being exposed to the discontinuity.

6 Claims, 7 Drawing Sheets

(56) References Cited

U.S. PATENT DOCUMENTS

| | | | |
|---|---|---|---|
| 2004/0179326 A1* | 9/2004 | Hattori | H01G 4/30 361/320 |
| 2011/0110014 A1* | 5/2011 | Hirata | H01G 4/30 156/89.12 |
| 2013/0049532 A1* | 2/2013 | Kim | H01C 7/18 361/321.1 |
| 2014/0376150 A1* | 12/2014 | Kim | H01G 4/30 361/301.4 |
| 2016/0155571 A1 | 6/2016 | Doi et al. | |
| 2019/0259535 A1* | 8/2019 | Kowase | H01G 4/228 |
| 2019/0267189 A1* | 8/2019 | Makino | H01G 4/0085 |

OTHER PUBLICATIONS

Samantaray et al., Electrode Defects in Multilayer Capacitors Part II: Finite Element Analysis of Local Field Enhancement and Leakage Current in Three-Dimensional Microstructures, Journal of the American Ceramic Society, vol. 95, No. 1, 2012, pp. 264-268.

\* cited by examiner

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2021-043794, filed on Mar. 17, 2021, the entire contents of which are incorporated herein by reference.

FIELD

A certain aspect of the present invention relates to a ceramic electronic device and a manufacturing method of the ceramic electronic device.

BACKGROUND

Recently, ceramic electronic devices such as high-end multilayer ceramic capacitors having high capacity and high reliability are requested in in-vehicle terminals or mobile terminals (for example, see Internal Publication No. 2015/016309).

SUMMARY OF THE INVENTION

According to an aspect of the present invention, there is provided a ceramic electronic device including: a multilayer structure in which each of a plurality of dielectric layers including Ba and Ti and each of a plurality of internal electrode layers including Ni and Sn are alternately stacked, wherein a discontinuity is formed in at least one of the plurality of internal electrode layers, the discontinuity being a break in a cross section including a stacking direction of the multilayer structure, and wherein an Sn high concentration portion, of which an Sn concentration is higher than an average Sn concentration of the one of the internal electrode layers, is formed on a part of a surface of the at least one of the internal electrode layers, the part of the surface being exposed to the discontinuity.

According to another aspect of the present invention, there is provided a manufacturing method of a ceramic electronic device including: forming a plurality of stack units, each of which has a structure in which an internal electrode pattern including Ni and Sn is formed on a dielectric green sheet including Ba and Ti, by a sputtering, forming a multilayer structure by stacking the plurality of stack units; and firing the multilayer structure so that a discontinuity is formed in an internal electrode layer formed from the internal electrode pattern, and an Sn high concentration portion having a higher Sn concentration than an average Sn concentration of the internal electrode layer is formed on a part of a surface of the internal electrode layer, the part of the surface being exposed to the discontinuity, wherein the discontinuity is a break in a cross section including a stacking direction of the stack units.

DETAILED DESCRIPTION

In order to achieve downsizing and high capacity, recently, a thickness of internal electrode layers and a thickness of dielectric layers are reduced. Thus, the high capacity is achieved. However, insulation resistance may be degraded due to breaking of the internal electrode layers (for example, see Samantaray, Malay M. et al., Journal of the American Ceramic Society 95 1 (2012):264-268). Insulation resistance of the dielectric layers may be degraded. In order to solve the problem, a different element is solid-solved in a dielectric material, and the insulation resistance is improved (for example, see Hiroshi Kishi et al., 2003 Jpn. J. Appl. Phys. 42 1).

However, in the above-mentioned technologies, the degradation of the reliability caused by the breaking of the internal electrode layers is not solved. An interface resistance between the internal electrode layers and the dielectric layers is larger than a grain boundary resistance and a resistance inside of a grain of the dielectric layers. Therefore, the above-mentioned technologies are not sufficient because the grain boundary resistance and the resistance inside of the grain are reduced when the thickness of the dielectric layers is reduced.

A description will be given of an embodiment with reference to the accompanying drawings.

EMBODIMENT

Figure 1:
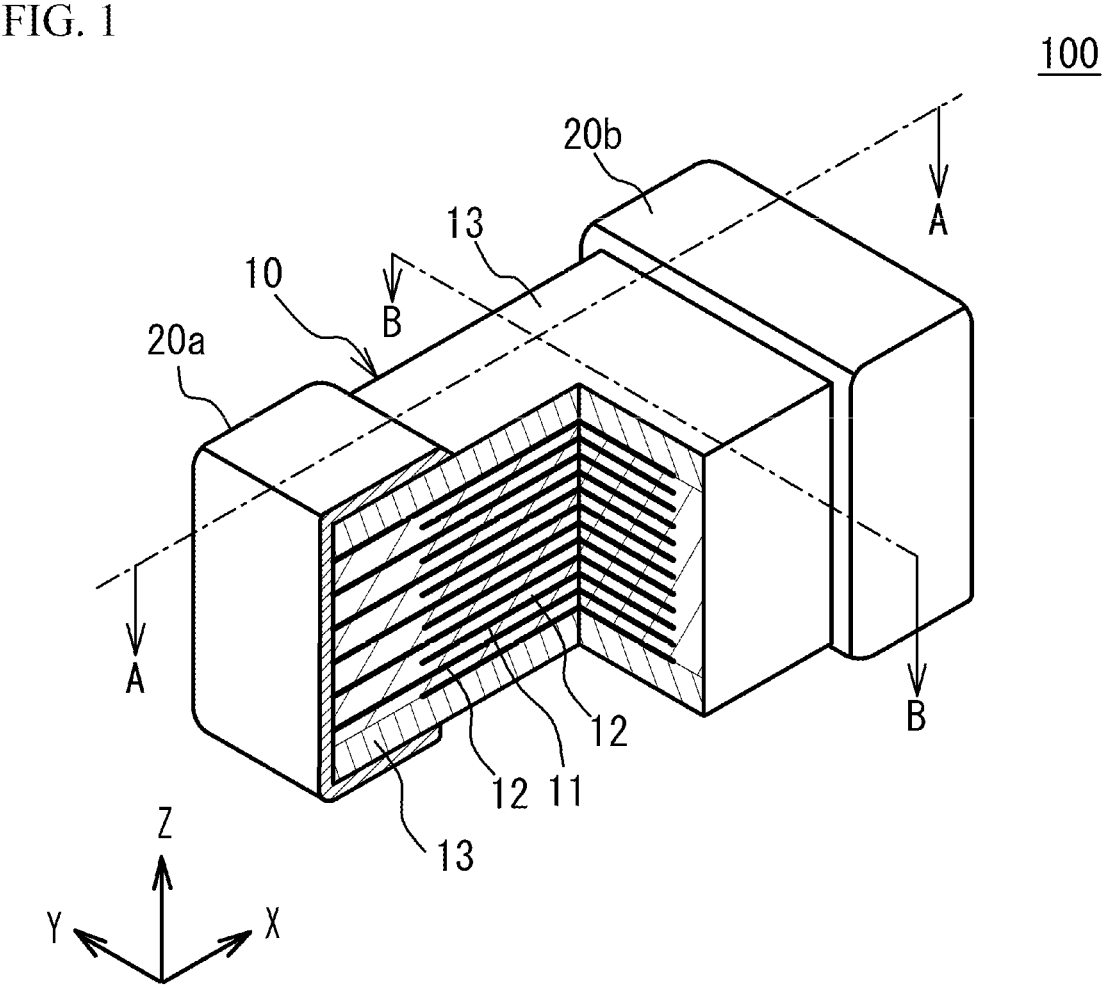
FIG. 1 illustrates a perspective view of a multilayer ceramic capacitor in which a cross section of a part of the multilayer ceramic capacitor is illustrated.
Figure 2:
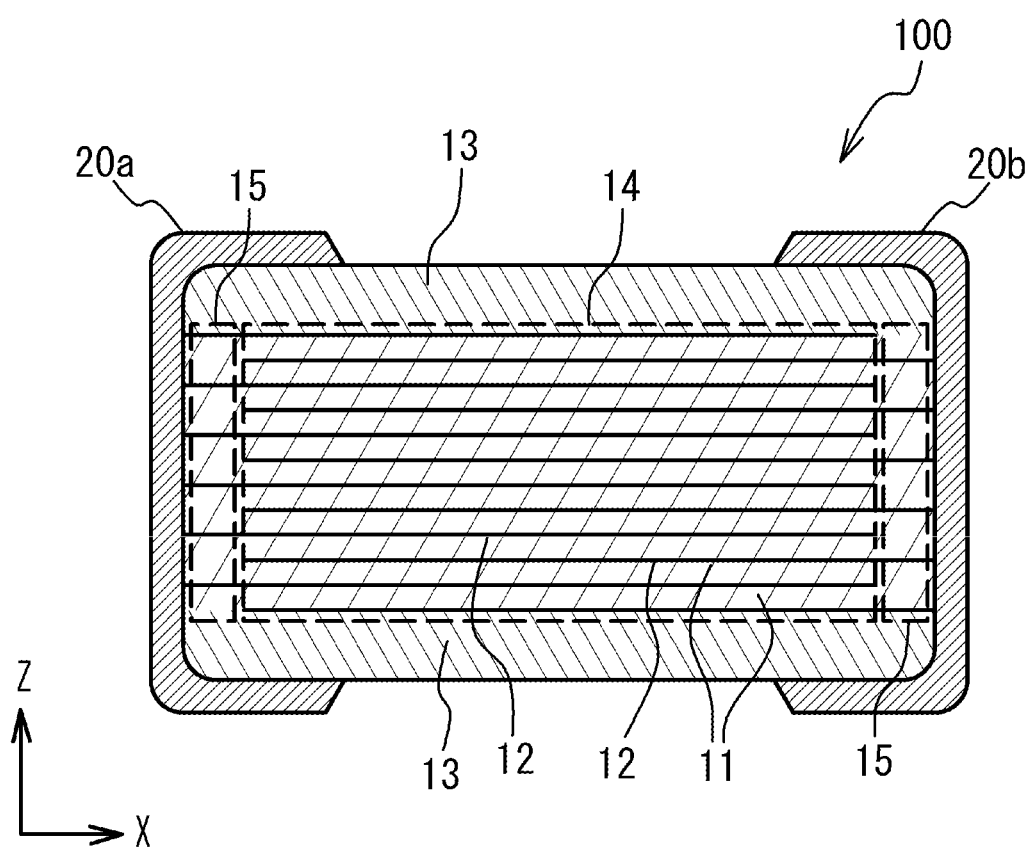
FIG. 2 illustrates a cross sectional view taken along a line A-A of FIG. 1.
Figure 3:
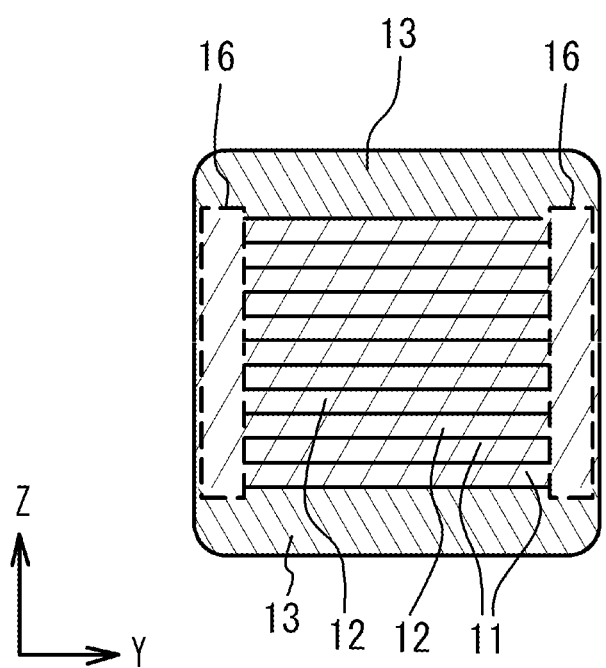
FIG. 3 illustrates a cross sectional view taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other. In FIG. 1, an X-axis direction (first direction) is a longitudinal direction of the multilayer chip 10. The X-axis direction is a direction in which the external electrode 20a is opposite to the external electrode 20b. A Y-axis direction (second direction) is a width direction of the internal electrode layers. A Z-axis direction is a stacking direction. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

The dielectric layers 11 are mainly composed of a ceramic material that is expressed by a general formula $ABO_3$ and has a perovskite structure. The perovskite structure includes $ABO_{3-\alpha}$, having an off-stoichiometric composition. For example, the ceramic material is a material in which an A site includes at least barium (Ba) and a B site includes at least titanium (Ti). For example, the ceramic material is such as $BaTiO_3$ (barium titanate), $Ba_{1-x-y}Ca_xSr_yTi_{1-z}Zr_zO_3$ ($0 \le x \le 1$, $0 \le y \le 1$, $0 \le z \le 1$) having a perovskite structure. An average thickness of each of the dielectric layers 11 may be, for example, 0.05 μm or more and 5 μm or less. The average thickness may be 0.1 μm or more and 3 μm or less. The average thickness may be 0.2 μm or more and 1 μm or less.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

Figure 4:
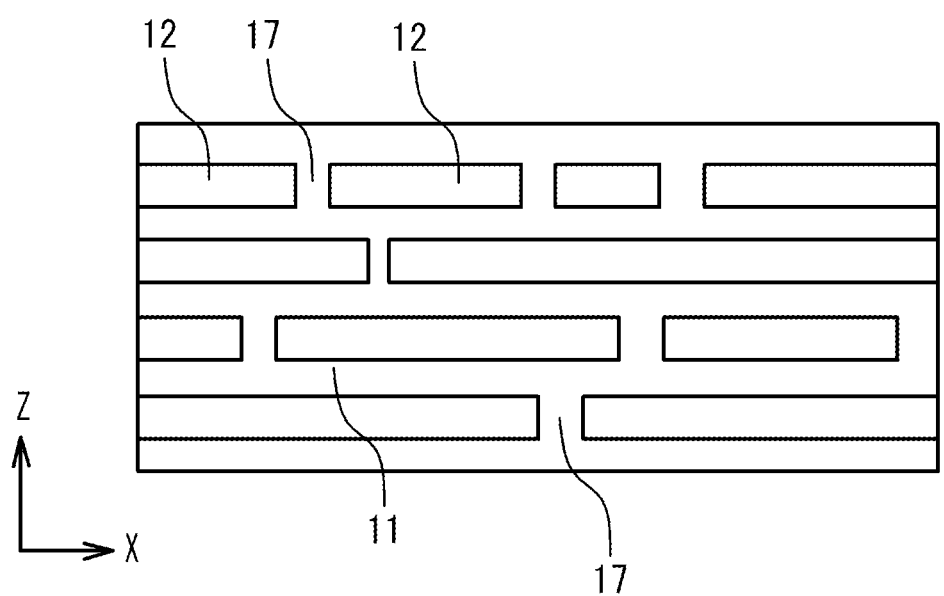
FIG. 4 illustrates discontinuities of internal electrode layers.

The dielectric layer 11 is formed by firing a dielectric material including ceramic material powder. The internal electrode layer 12 is formed by firing a paste material including metal powder. In the firing process, a discontinuity 17 in which a partial breaking occurs may appears in the internal electrode layer 12 as illustrated in FIG. 4. FIG. 4 illustrates a cross sectional view taken along the XZ plane. Therefore, in FIG. 4, the internal electrode layer 12 seems to be divided into a plurality of parts in the X-axis direction by the discontinuity 17. However, the parts may be connected to each other in a cross section of a different position in the Y-axis direction. For example, the discontinuity 17 has a hole shape in a planar view along the Z-axis direction. The discontinuity 17 may be a cavity. Alternatively, the dielectric material of the dielectric layer 11 may be located in the discontinuity 17.

Electric field concentration tends to occur in the discontinuity 17 of the internal electrode layer 12. The insulation resistance may be reduced in a portion where the electric field concentration occurs. Therefore, the reliability may be degraded. Accordingly, it is thought that a different element is solid-solved in the dielectric material, and the insulation characteristic of the dielectric layer 11 is improved. However, in the method, the degradation of the reliability caused by the discontinuity 17 of the internal electrode layer 12 may not necessarily be solved. The insulation resistance of the interface between the internal electrode layer 12 and the dielectric layer 11 is larger than the insulation resistance of the grain boundary or the grain of the dielectric layer 11. Moreover, the grain boundary and the grain are downsized due to the thickness reduction of the dielectric layer 11. Therefore, the above-mentioned method is insufficient.

Accordingly, a main component of the internal electrode layer 12 of the embodiment includes nickel (Ni). The internal electrode layer 12 includes tin (Sn). When the internal electrode layer 12 includes Ni and Sn, resistance to humidity of the multilayer ceramic capacitor 100 may be improved. For example, when Ni and Sn form an alloy, the condition of the interface between the internal electrode layer 12 and the dielectric layer 11 changes. In this case, the resistance to humidity of the multilayer ceramic capacitor 100 may be improved. And, the reliability of the multilayer ceramic capacitor 100 may be improved.

Figure 5A:
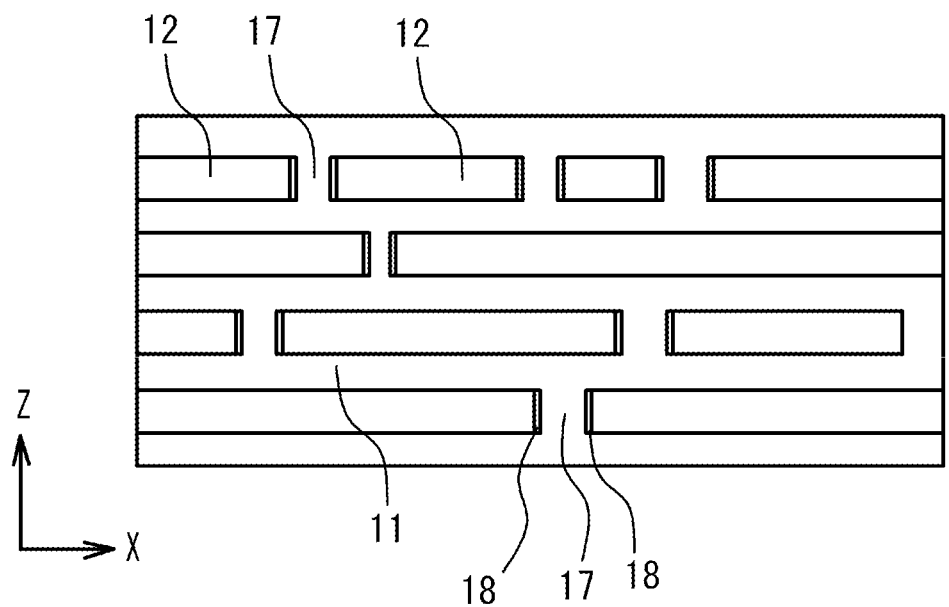
FIG. 5A and FIG. 5B illustrate Sn high concentration portions.

Moreover, in at least one of the internal electrode layers 12, the Sn concentration near the discontinuity 17 is increased. In concrete, as illustrated in FIG. 5A, in at least one of the internal electrode layers 12, on a surface exposed to the discontinuity 17 (an inner wall of a hole formed by the discontinuity 17 in the internal electrode layer 12), an Sn high concentration portion 18 is provided. The Sn high concentration portion 18 is a portion which has a larger Sn concentration than the average Sn concentration of the whole of one internal electrode layer 12.

An potential barrier (Schottky barrier) is increased on an interface between the internal electrode layer 12 and the dielectric layers 11 near the discontinuity 17, because of the high concentration Sn which is segregated on a surface exposed to the discontinuity 17. Thereby, the insulation resistance is increased. Thus, the degradation of the insulation resistance caused by the electric field concentration near the discontinuity 17 is suppressed. Moreover, when Ti ions near the discontinuity 17 are replaced with Sn ions near the discontinuity 17, energy for generating oxygen vacancy near the discontinuity 17 is increased. In this case, a concentration of the oxygen vacancy near the discontinuity 17 gets smaller than the case where Ni diffuses into the dielectric layers 11. And, the insulation resistance increases. Accordingly, the reliability of the multilayer ceramic capacitor 100 is improved.

Figure 5B:
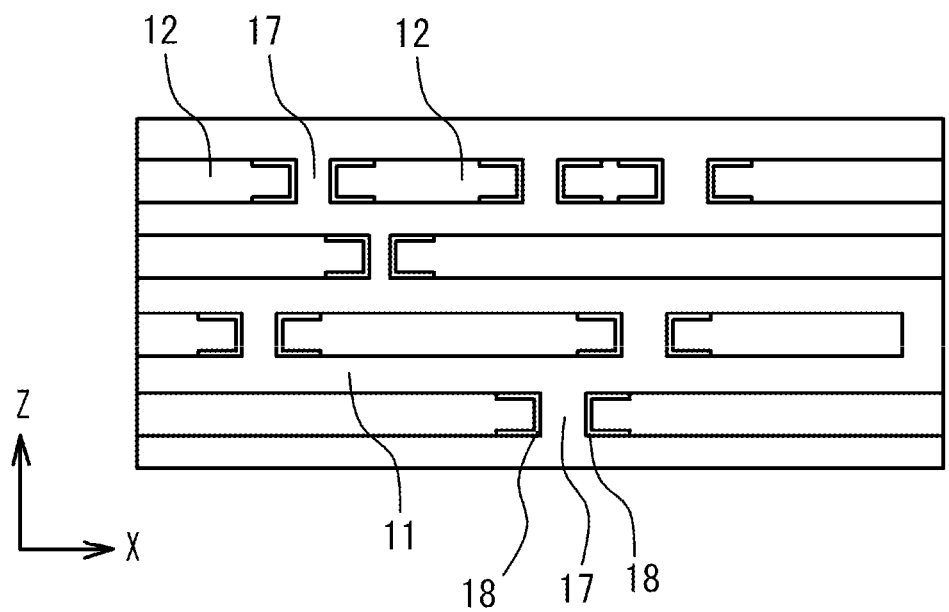

From a viewpoint of enhancing the effect of improving the insulation characteristic by the Sn high concentration portion 18, it is preferable that the Sn high concentration portion 18 continuously extends from the surface exposed to the discontinuity 17 to at least one of the upper face and the lower face of the internal electrode layer 12, as illustrated in FIG. 5B. That is, it is preferable that the Sn high concentration portion 18 extends from the surface exposed to the discontinuity 17 to the interface between the internal electrode layer 12 and the dielectric layer 11 next to the internal electrode layer 12.

On the other hand, when the Sn high concentration portion 18 covers the whole of the upper face and the whole of the lower face of the internal electrode layer 12, breakdown of the multilayer ceramic capacitor 100 may occur due to peeling at an interface between the internal electrode layer 12 and the dielectric layer 11. Accordingly, it is preferable that the Sn high concentration portions 18 extending from the discontinuities 17 of the internal electrode layer 12 are spaced from each other on the interface between the internal electrode layer 12 and the dielectric layer 11 next to the internal electrode layer 12.

The Sn concentration in the Sn high concentration portion 18 is, for example, twice or more of an average Sn concentration of each of the internal electrode layers 12. For example, the Sn concentration of the Sn high concentration portion 18 is 0.2 at % or more with respect to Ni of the Sn high concentration portion 18, when the average Sn concentration of each of the internal electrode layers 12 is 0.1 at %.

When the amount of Sn in the internal electrode layers 12 is excessively large, the continuity modulus of the internal electrode layers 12 may be reduced. In this case, the capacity may be reduced. Accordingly, it is preferable that the amount of Sn in the internal electrode layers 12 has an upper limit. For example, it is preferable that the concentration of Sn with respect to Ni in the whole of one internal electrode layer 12 is 0.1 at % or less. It is more preferable that the concentration of Sn is 0.07 at % or less. It is still more preferable that the concentration of Sn is 0.05 at % or less. The concentration of Sn with respect to Ni is an amount of Sn on a presumption that the amount of Ni+Sn is 100 at %.

The thickness of each of the internal electrode layers 12 may be 0.01 µm or more and 5 µm or less. The thickness may be 0.05 µm or more and 3 µm or less. The thickness may be 0.1 µm or more and 1 µm or less. For example, when the thickness of the internal electrode layers 12 is 1 µm or less, the continuity modulus tends to be reduced due to breaking during the firing. In this case, the effect of the embodiment may be remarkable. In the multilayer ceramic capacitor 100, the number of the stacked internal electrode layers 12 may be 10 to 5000, 50 to 4000, or 100 to 3000. The internal electrode layers 12 having the Sn high concentration portion 18 are formed through the firing process after forming internal electrode patterns by a sputtering, as described later. Therefore, the internal electrode layers 12 of the embodiment do not include any co-material of ceramic grains.

Figure 6:
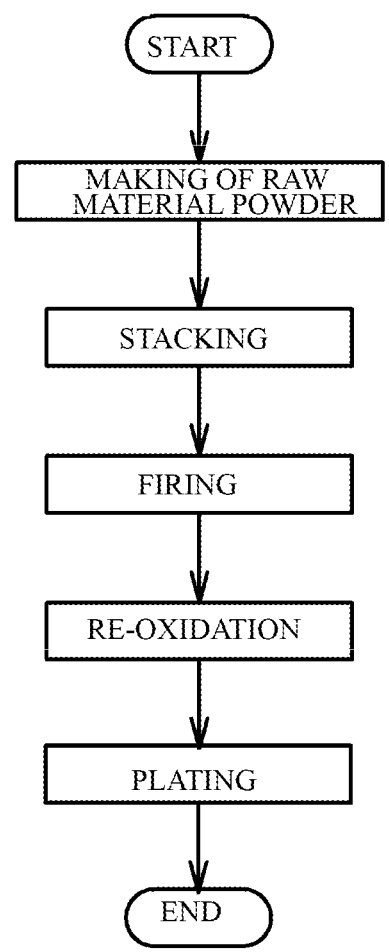
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to the resulting ceramic powder, in accordance with purposes. The additive compound may be an oxide of magnesium (Mg), manganese (Mn), vanadium (V), chromium (Cr) or a rare earth element (yttrium (Y), samarium (Sm), europium (Eu), gadolinium (Gd), terbium (Tb), dysprosium Dy), holmium (Ho), erbium (Er), thulium (Tm) and ytterbium (Yb)), or an oxide of cobalt (Co), nickel (Ni), lithium (Li), boron (B), sodium (Na), potassium (K) and silicon (Si). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 7A:
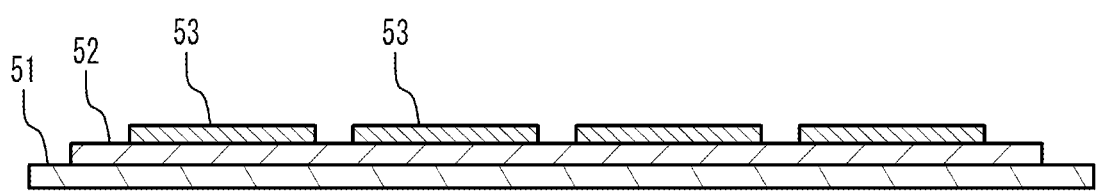
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The forming method of the internal electrode pattern 53 is a sputtering. NiSn alloy may be used as a target of the sputtering. Alternatively, a target of Ni and another target of Sn may be used. In this case, the targets may be used together with each other in a single sputtering. The dielectric green sheet 52 on which the internal electrode pattern 53 is used as a stack unit.

Figure 7B:
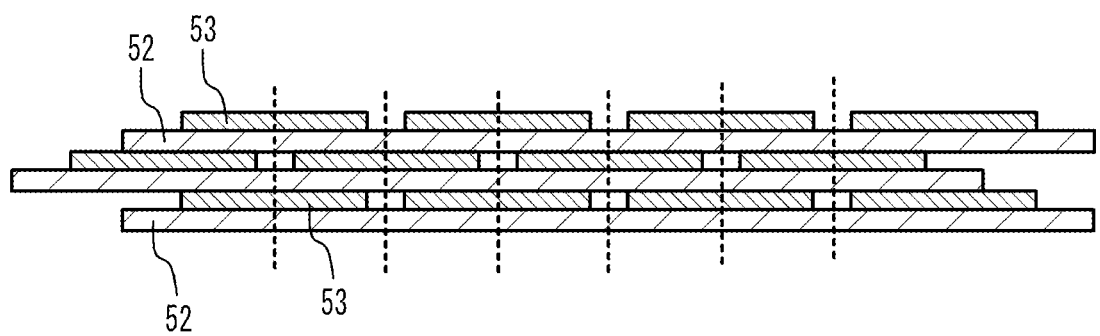

Next, the dielectric green sheets 52 are peeled from the base materials 51. As illustrated in FIG. 7B, the stack units are stacked. Next, a predetermined number (for example, 2 to 10) of a cover sheet is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 7B, the multilayer structure is cut along a dotted line. The components of the cover sheet may be the same as those of the dielectric green sheet 52. Additives of the cover sheet may be different from those of the dielectric green sheet 52.

(Firing process) The binder is removed from the ceramic multilayer structure in $N_2$ atmosphere. Metal paste to be the base layers of the external electrodes 20a and 20b is applied to the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b.

In the manufacturing method of the embodiment, the internal electrode pattern 53 including Ni and Sn is formed by the sputtering. In this case, compared to the case where a paste material is fired, the discontinuity 17 tends to be formed when the internal electrode pattern 53 formed by the sputtering is fired. Sn which is formed by the sputtering together with Ni is easily diffused into the $BaTiO_3$ material. However, the amount of the $BaTiO_3$ material is small in the discontinuity 17. Therefore, a driving force for diffusion gets smaller. In this case, Sn is left in the discontinuity 17. Accordingly, as described in FIG. 5A and FIG. 5B, the Sn high concentration portion 18 is formed near the discontinuity 17. Moreover, Sn tends to be left in a discontinuity formed by firing the sputtering film, compared to the discontinuity formed by firing the paste material. It is thought that this is because the co-material in the paste material suppresses the diffusion of Sn into the dielectric layers 11.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Although the embodiments of the present invention have been described in detail, it is to be understood that the various change, substitutions, and alterations could be made hereto without departing from the spirit and scope of the invention.

What is claimed is:

1. A ceramic electronic device comprising:
    a multilayer structure in which each of a plurality of dielectric layers including Ba and Ti and each of a plurality of internal electrode layers including Ni and Sn are alternately stacked,
    wherein a discontinuity is formed in at least one of the plurality of internal electrode layers, the discontinuity being a break in a cross section including a stacking direction of the multilayer structure, and
    wherein an Sn high concentration portion, of which an Sn concentration is higher than an average Sn concentration of the one of the internal electrode layers, is formed on a part of a surface of the at least one of the internal electrode layers, the part of the surface being exposed to the discontinuity.

2. The ceramic electronic device as claimed in claim 1, wherein the Sn high concentration portion extends from the part of the surface exposed to the discontinuity to an interface between the one of the internal electrode layers and a dielectric layer next to the one of the internal electrode layers.

3. The ceramic electronic device as claimed in claim 2, wherein the one of the internal electrode layers has two or more of discontinuities from which Sn high concentration portions extend, and
    wherein the Sn high concentration portions are spaced from each other on an interface between the one of the internal electrode layers and a dielectric layer next to the one of the internal electrode layers.

4. The ceramic electronic device as claimed in claim 1, wherein an Sn concentration with respect to Ni is 0.1 at % or less in the one of the internal electrode layers.

5. The ceramic electronic device as claimed in claim 1, wherein a thickness of the one of the internal electrode layers is 1 µm or less.

6. A manufacturing method of a ceramic electronic device comprising:
    forming a plurality of stack units, each of which has a structure in which an internal electrode pattern including Ni and Sn is formed on a dielectric green sheet including Ba and Ti, by a sputtering,
    forming a multilayer structure by stacking the plurality of stack units; and
    firing the multilayer structure so that a discontinuity is formed in an internal electrode layer formed from the internal electrode pattern, and an Sn high concentration portion having a higher Sn concentration than an average Sn concentration of the internal electrode layer is formed on a part of a surface of the internal electrode layer, the part of the surface being exposed to the discontinuity,
    wherein the discontinuity is a break in a cross section including a stacking direction of the stack units.

* * * * *